United States Patent Office 2,872,382
Patented Feb. 3, 1959

2,872,382
BIFIDOGENIC COMPOSITIONS

Johannes Keck, Biberach (Riss), Germany, assignor to Dr. Karl Thomae G. m. b. H., Biberach (Riss), Germany, a corporation of Germany No Drawing. Application December 10, 1957
Serial No. 701,721

Claims priority, application Great Britain
December 11, 1956

8 Claims. (Cl. 195—100)

This invention relates to bifidogenic compositions for infants and children, i. e. compositions which on administration to an infant or child promote the growth of *Lactobacillus bifidus* in the intestines.

It is known that the intestinal flora of breast-fed infants consist almost exclusively of *Lactobacillus bifidus*, but that the stool of bottle-fed infants does not contain these *bifidus* flora.

It is also known that the number of infectious diseases among bottle-fed babies is considerably higher than among breast-fed babies, and that mortality as a result of infectious diseases is far more frequent among bottle-fed babies than among breast-fed babies; see C. G. Grulee, H. N. Sanford, P. H. Herron, J. Am. Med. Assoc. 103, 735–738 (1934); C. G. Grulee, H. N. Sanford, H. Schwartz, J. Am. Med. Assoc. 104, 1986–1988 (1935); M. Robinson, Lancet 260, 788–793 (1951).

Renowned pediatricians have established that the healthy development of breast-fed babies is directly attributable to the presence of *bifidus* flora in the intestines; J. B. Mayer, Erg. inn. Med. Kinderheilkunde, vol. 7, pp. 447–449, Springer-Verlag (1956). For this reason numerous attempts have been made to develop bifidogenic milk nutrients for infants and children; see, for example, U. S. Patent 2,697,663 and German patent application G10,849 Iva/53k, filed January 28, 1953. Thus, the U. S. patent suggests adding 0.5–5% by weight gastric mucin from pigs and the German application suggests adding 0.1–5% by weight hydrolyzed chitin to infants' and children's formulas. Also β-lactose has been proposed as a bifidogenic additive to infants' and children's milk formulas; see Arztl. Wschr. 5, 201–206 (1950).

I have discovered that compositions comprising phosphatides or phosphatide acids having the structural formulas

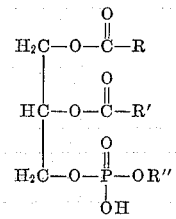

and

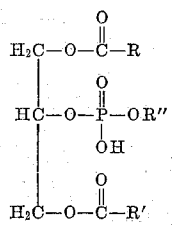

wherein

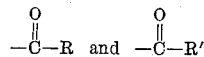

represent two unsaturated carboxylic acid radicals, or one unsaturated and one saturated carboxylic acid radical, said radicals containing from 16–22 carbon atoms, and R" represents choline, colamine, serine or hydrogen, and cystine ($\beta,\beta'$-dithiodialanine) and/or cysteine (2-amino-3-mercaptopropanoic acid), in which the ratio of the cystine and/or cysteine to the phosphatide or phosphatide acid is within the range of 1:20 to 1:0.33 by weight, possess strong growth-promoting action on *Lactobacillus bifidus* in infants' and children's intestines.

Examples of phosphatides or phosphatide acids which may be included in preparations according to the present invention are lecithin, dioleyl lecithin, cephaline and dioleyl-glyceryl-phosphoric acid. The phosphatides and phosphatide acids may be produced synthetically or may be isolated from natural sources.

As stated above, the ratio of cystine and/or cysteine to phosphatide and/or phosphatide acid should be within the range of 1:20 to 1:0.33 by weight. We have found however, that within this range best results are obtained when the ratio of cystine and/or cysteine to phosphatide and/or phosphatide acid is within the range 1:10 to 1:3 by weight, and accordingly we prefer to employ compositions containing these components within the more limited range of quantitative ratios.

The strong growth-promoting activity of the compositions according to the invention for *Lactobacillus bifidus* is apparent from the fact that they still effect a definitely demonstrable growth-increase within 24 hours in a concentration of 1–2$\gamma$ per cc. of a specific culture medium. Such a culture medium may contain the following components per liter (see Ang. 64, 496 (1952)):

| | |
|---|---:|
| Lactose | gm__ 35.0 |
| Casein-peptone | gm__ 5.0 |
| Sodium acetate (anhydrous) | gm__ 25.0 |
| $KH_2PO_4$ | gm__ 5.0 |
| $MgSO_4 \cdot 7H_2O$ | mgm__ 200 |
| $FeSO_4 \cdot 7H_2O$ | mgm__ 10 |
| NaCl | mgm__ 10 |
| $MnSO_4 \cdot 2H_2O$ | mgm__ 7 |
| D,L-alanine | mgm__ 200 |
| D,L-tryptophane | mgm__ 200 |
| L-asparagine | mgm__ 100 |
| Ascorbic acid | gm__ 1.0 |
| Adenine | mgm__ 10 |
| Guanine | mgm__ 10 |
| Xanthine | mgm__ 10 |
| Uracil | mgm__ 10 |
| Vitamin $B_1$ | 200$\gamma$ |
| Vitamin $B_2$ | 200$\gamma$ |
| Vitamin $B_6$ | 1200$\gamma$ |
| Pantothenic acid (Ca-salt) | 400$\gamma$ |
| p-Aminobenzoic acid | 10$\gamma$ |
| Folic acid | 10$\gamma$ |
| Biotin | 4$\gamma$ |

The test to prove the growth increase is carried out by admixing the culture medium with the corresponding quantity of growth-promoting substance, adjusting the pH to 5.7, dividing the resulting mixture into 12 cc. portions, each of which is placed into a test tube which is sealed with cellulose and then sterilized for 5 minutes at 120° C. After cooling, the test tube is inoculated with a suspension of *Lactobacillus bifidus* organisms and incubated for 24 hours at 37° C.

Lactic acid is formed during the growth of *Lactobacillus bifidus*. Thus, the amount of lactic acid in the culture is a direct measure for the multiplication of the organism. The quantity of lactic acid formed is quantitatively determined by titration of 10 cc. of the culture medium with 0.1 N NaOH to the initial pH of 5.7 The greater the consumption of NaOH, the stronger is the growth of *Lactobacillus bifidus*.

Numerous strains of *Lactobacillus bifidus* were isolated from various infants' stools, which were given identification numbers. A typical experimental procedure with some of these strains, using cystine in combination with lecithin as the phosphatide (growth substance) is given in the following table:

| Strain No | Consumption of 0.1 N NaOH | | | |
|---|---|---|---|---|
| | 1 | 11 | 20 | 27 |
| Culture medium alone | 0.8 | 0.4 | 1.3 | 0.3 |
| Culture medium+0.2 mgm. cystine/cc | 1.0 | 0.5 | 2.9 | 0.2 |
| Culture medium+0.2 mgm. cystine/cc. and 1 mgm. growth substance/cc | 10.0 | 8.0 | 16.2 | 9.7 |
| Culture medium+0.2 mgm. cystine/cc. and 0.1 mgm. growth substance/cc | 8.2 | 5.0 | 12.5 | 7.4 |
| Culture medium+0.2 mgm. cystine/cc. and 0.01 mgm. growth substance/cc | 8.1 | 3.1 | 11.3 | 6.0 |
| Culture medium+0.2 mgm. cystine/cc. and 0.005 mgm. growth substance/cc | 5.4 | 1.5 | 9.5 | 2.0 |
| Culture medium+0.2 mgm. cystine/cc. and 0.001 mgm. growth substance/cc | 1.5 | 0.9 | 4.0 | 0.8 |

The composition according to the invention may be formulated in any convenient manner suitable for administration to infants, either alone or as an additive to normal food, for example, cow's milk. Thus, the composition may be formulated as a powder which can be incorporated in dried milk, or as a granulate, or in tablet form adapted to be added to infant food. The composition may also be formulated as a suspension or may be incorporated in wafers.

The composition according to the invention preferably contains other nutrient substances such as sugars, vitamins, and the like. Thus, for example, it preferably contains lactose and/or ascorbic acid.

Examples of preferred embodiments of the invention are liquid infant food compositions or solid concentrates adapted to be made up into a liquid food composition, comprising a composition according to the invention together with one or more infant nutrients. Such nutrients are, for example, cow's milk or cow's milk solids.

Such liquid infant food compositions preferably contain the active bifidogenic ingredients in the concentrations set out below, the concentrations being expressed as concentrations per liter of liquid infant food.

Phosphatides and/or phosphatide acids___gm__ 0.1–2.0
Cystine and/or cysteine_____mgm__ 50–300
Lactose _____gm__ 5–100
Ascorbic acid_____mgm__ 0–100

In order that the invention may be better understood, the following examples are given for purposes of illustration only.

EXAMPLE 1

*Granulate bifidogenic composition containing lecithin*

The granulate is compounded from two separately produced granulates A and B.

GRANULATE A

Composition:
 Lecithin _____gm__ 1.0
 Lactose _____gm__ 25.0
 Potato starch_____gm__ 6.7
 Colloidal amorphous silicone (registered trademark "Aerosil")_____gm__ 0.3
 ———
 gm__ 33.0

*Production of Granulate A.*—1.0 gm. lecithin is dissolved in approximately 4 cc. ethyl alcohol. 15 gm. lactose are evenly admixed with this solution. The resulting mixture is dried at a temperature of 45° C. The powder thus obtained is admixed with additional 10 gm. lactose, and with 0.3 gm. aerosil and 5.8 gm. starch. The resulting mixture is granulated with a starch mucilage (prepared from 0.9 gm. starch and 8.1 gm. water), by passing the mixture through a screen having a mesh aperture of 1 mm., and drying the resulting granulate at 45° C. The resulting granulate is freed of the finer particles by passing it through a screen having an 0.5 mm. mesh aperture.

GRANULATE B

Composition:
 l-Cystine _____gm__ 0.15
 l-Ascorbic acid_____gm__ 0.05
 Milk sugar_____gm__ 5.00
 Potato starch_____gm__ 1.40
 Talcum _____gm__ 0.40
 ———
 gm__ 7.00

*Production of Granulate B.*—0.15 gm. l-cystine and 0.05 gm. l-ascorbic acid are finely comminuted with 2 gm. pulverized lactose. This mixture is then further admixed with 3 gm. lactose, 1.4 gm. potato starch and 0.4 gm. talcum. The resulting mixture is briquetted. The briquets obtained are comminuted. The larger particles are removed from the resulting granulate by passing it through a screen having a 1.25 mm. mesh aperture, and the smaller parts are removed by passing the screened granulate through another screen having an 0.75 mm. mesh aperture.

*Preparation of the final granulated bifidogenic composition.*—33.0 gm. of Granulate A and 7.0 gm. of Granulate B are admixed to yield 40.0 gm. of final granulate bifidogenic composition. This granulate may be added in any required quantity to liquid infants' food.

EXAMPLE 2

*Sachets*

The final granulate described in Example 1 is filled in individual portions of 2.0 gm. into sachets of a suitable size which sachets contain a sufficient dose of the composition for a particular quantity of infants' liquid food.

EXAMPLE 3

*Granulate bifidogenic composition containing dioleyl-lecithin*

GRANULATE A

Composition:
 Dioleyl-lecithin _____gm__ 0.75
 Lactose powder_____gm__ 26.00
 Sucrose _____gm__ 2.25
 ———
 29.00

GRANULATE B

Composition:
 l-cystine _____gm__ 0.15
 Vitamin C_____gm__ 0.05
 Lactose powder_____gm__ 4.00
 Sucrose _____gm__ 0.50
 ———
 gm__ 4.70

*Production of Granulate A.*—0.75 gm. dioleyl-lecithin are dissolved in 4 cc. ethyl alcohol and 26.0 gm. lactose are evenly moistened with this solution. The resulting mixture is dried at a temperature of 45° C. The resulting powder is granulated with a solution of 2.25 gm. sucrose in 2.25 cc. water (mesh aperture 1.25 mm., drying of the granulate at 45° C.). The resulting granulate is freed from finer particles by passing it through a screen having an 0.5 mm. mesh aperture.

*Production of Granulate B.*—0.15 gm. l-cystine and 0.05 gm. vitamin C are finely comminuted with 4.0 gm. lactose. The resulting powder is granulated with a solution of 0.5 gm. sucrose in 0.5 cc. water (mesh aperture 1.25 mm., drying of the granulate at 45° C.). Thereafter, Granulates A and B are intimately admixed with each other.

EXAMPLE 4

*Bifidogenic powder containing lecithin adapted for use as an additive to dried milk*

Composition:

| | |
|---|---|
| l-cystine | gm.. 0.15 |
| Lecithin | gm.. 1.00 |
| Lactose powder | gm.. 30.00 |
| Talcum | gm.. 0.35 |
| | gm.. 31.50 |

*Production of bifidogenic powder.*—1.0 gm. lecithin is dissolved in approximately 4 cc. ethyl alcohol. 15 gm. milk sugar are evenly moistened with this solution. The resulting mixture is dried at 45° C. 0.15 gm. l-cystine is finely comminuted with 5 gm. milk sugar. Both powders are then intimately admixed with the remaining 10.0 gm. lactose and 0.35 gm. talcum.

The bifidogenic powder thus obtained is mixed with dried milk, for example in a quantity of 6.3 gm. per individual dose of milk-powder.

EXAMPLE 5

*Bifidogenic powder containing cephalin adapted for use as additive to dried milk*

Composition:

| | Gm. |
|---|---|
| l-Cystine | 0.15 |
| Cephalin | 1.00 |
| Lactose powder | 30.00 |
| Talcum | 0.35 |
| | 31.50 |

*Production of bifidogenic powder.*—1.0 gm. cephalin is dissolved in approximately 5 cc. chloroform. 15 gm. lactose are evenly moistened with this solution. The resulting mixture is dried at 45° C. 0.15 gm. l-cystine is finely comminuted with 5 gm. of lactose. The two powders are then thoroughly admixed with each other and with the remaining 10 gm. lactose and 0.35 gm. talcum. The powder thus obtained can be admixed with dried milk in any desired quantity.

EXAMPLE 6

*Bifidogenic powder containing dioleyl-glyceryl-phosphoric acid adapted for use as additive to dried milk*

Composition:

| | Gm. |
|---|---|
| l-Cystine | 0.15 |
| Dioleyl-glyceryl-phosphoric acid | 1.25 |
| Lactose powder | 30.00 |
| Talcum | 0.35 |
| | 31.75 |

*Production of bifidogenic powder.*—1.25 gm. dioleyl-glyceryl-phosphoric acid are dissolved in approximately 4 cc. ethyl alcohol. 15 gm. lactose are evenly moistened with this solution. The resulting mixture is dried at 45° C. 0.15 gm. l-cystine is then finely comminuted with 5 gm. lactose. The two powders are thoroughly admixed with each other and with 10 gm. lactose and 0.35 gm. talcum.

The powder thus obtained is admixed with dried milk, for example in a quantity of 6.3 gm. per dose of milk powder.

EXAMPLE 7

*Bifidogenic suspension adapted for use as additive to liquid food*

Composition:

| | Gm. |
|---|---|
| l-Cystine | 0.15 |
| Lecithin | 1.00 |
| Lactose | 30.00 |
| Methylcellulose (medium viscosity) | 2.00–6.00 |
| p-Hydroxybenzoic acid methylester | 0.07 |
| p-Hydroxybenzoic acid-propylester | 0.03 |
| Distilled water, q. s. ad 250.00 g. | |

*Production.*—0.07 gm. p-hydroxybenzoic acid methyl ester and 0.03 gm. p-hydroxybenzoic acid propyl ester are dissolved in approximately 200 gm. water accompanied by warming. After cooling, a homogeneous mixture of 1 gm. lecithin and 25 gm. lactose (finely powdered) is dissolved in the solution. 2 to 6 gm. methylcellulose and a comminuted mixture of 0.15 gm. l-cystine and 5 gm. lactose (finely powdered) are then added to the solution while stirring. Water is then added in an amount sufficient to make 250 gm. The suspension thus obtained can be added to liquid infants' food.

While I have illustrated the present invention with the aid of certain specific embodiments thereof, it will be apparent to those skilled in the art that the invention is not limited to those embodiments, and that various changes and modifications can be made without departing from the spirit of the invention or the scope of the appended claims.

I claim:

1. A bifidogenic composition comprising a phosphatide compound having a structural formula selected from the group consisting of

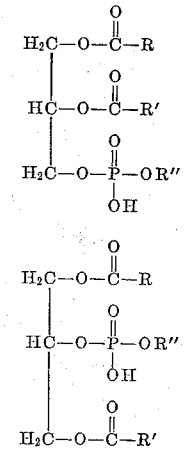

and wherein R and R' are selected from the group consisting of saturated and unsaturated hydrocarbon radicals with 15 to 21 carbon atoms, and R'' is selected from the group consisting of choline, colamine, serine and hydrogen, and an amino acid selected from the group consisting of cystine and cysteine, the weight ratio between the amino acid and the phosphatide compound in said composition being within the range 1:0.33 to 1:20.

2. A bifidogenic composition comprising from about 68% to about 99.9% by weight lactose and from about 0.1% to about 32% by weight of a mixture composed of a phosphatide compound having a structural formula selected from the group consisting of

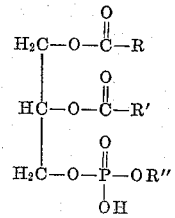

and

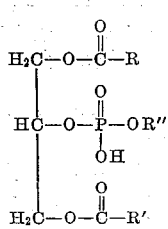

wherein R and R' are selected from the group consisting of saturated and unsaturated hydrocarbon radicals with 15 to 21 carbon atoms, and R'' is selected from the group consisting of choline, colamine, serine and hydrogen, and an amino acid selected from the group consisting of cystine and cysteine, the weight ratio between said amino acid and said phosphatide compound in said mixture being within the range 1:0.33 to 1:20.

3. A bifidogenic composition comprising lecithin, cystine, lactose, ascorbic acid, potato starch and talcum, the weight ratio of cystine and lecithin in said composition being within the range 1:0.33 to 1:20.

4. A bifidogenic composition comprising dioleyl lecithin, cystine, ascorbic acid, lactose and sucrose, the weight ratio of cystine to dioleyl lecithin in said composition being within the range 1:0.33 to 1:20.

5. A bifidogenic composition comprising cystine, lecithin, lactose and talcum, the weight ratio of cystine to lecithin in said composition being within the range 1:0.33 to 1:20.

6. A bifidogenic composition comprising cephalin, cystine, lactose and talcum, the weight ratio of cystine to cephalin in said composition being within the range 1:0.33 to 1:20.

7. A bifidogenic composition comprising dioleyl-glyceryl-phosphoric acid, cystine, lactose and talcum, the weight ratio of cystine to dioleyl-glyceryl-phosphoric acid in said composition being within the range 1:0.33 to 1:20.

8. A bifidogenic composition comprising lecithin, cystine, lactose, methyl cellulose, p-hydroxy benzoic acid methyl ester, p-hydrobenzoic acid propylester and water, the weight ratio of cystine to lecithin in said composition being within the range 1:0.33 to 1:20.

References Cited in the file of this patent
UNITED STATES PATENTS

| | | |
|---|---|---|
| 2,694,640 | Gyorgy et al. | Nov. 16, 1954 |
| 2,697,663 | Tomarelli et al. | Dec. 21, 1954 |
| 2,708,165 | Gyorgy et al. | May 10, 1955 |
| 2,708,178 | Gyorgy | May 10, 1955 |
| 2,710,806 | Gyorgy et al. | June 14, 1955 |
| 2,710,807 | Gyorgy et al. | June 14, 1955 |
| 2,768,116 | Gyorgy et al. | Oct. 23, 1956 |
| 2,770,573 | Gyorgy et al. | Nov. 13, 1956 |
| 2,783,148 | Gyorgy et al. | Feb. 26, 1957 |
| 2,792,389 | Tomarelli et al. | May 14, 1957 |
| 2,811,450 | Petuely | Oct. 29, 1957 |